Patented Mar. 11, 1952

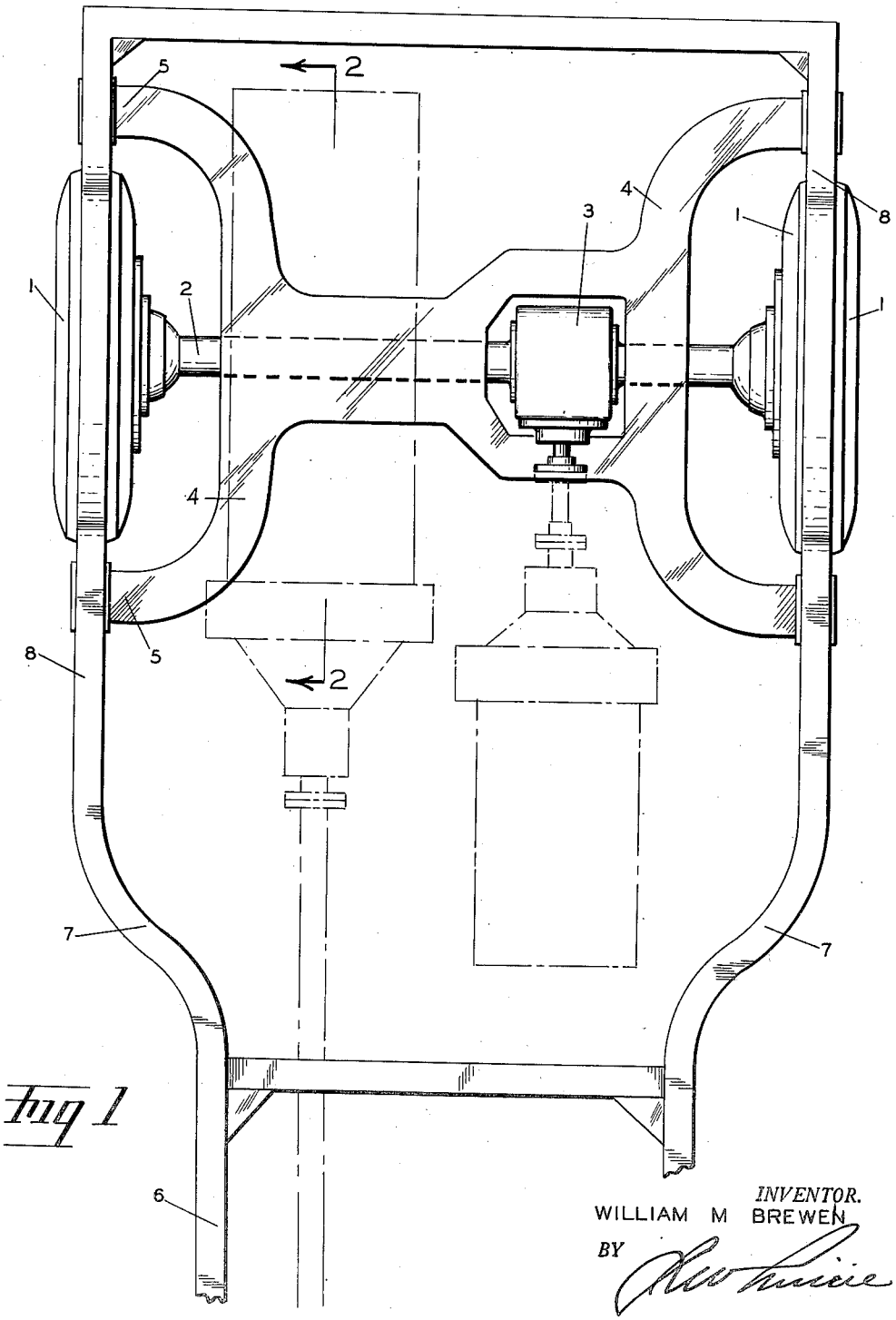

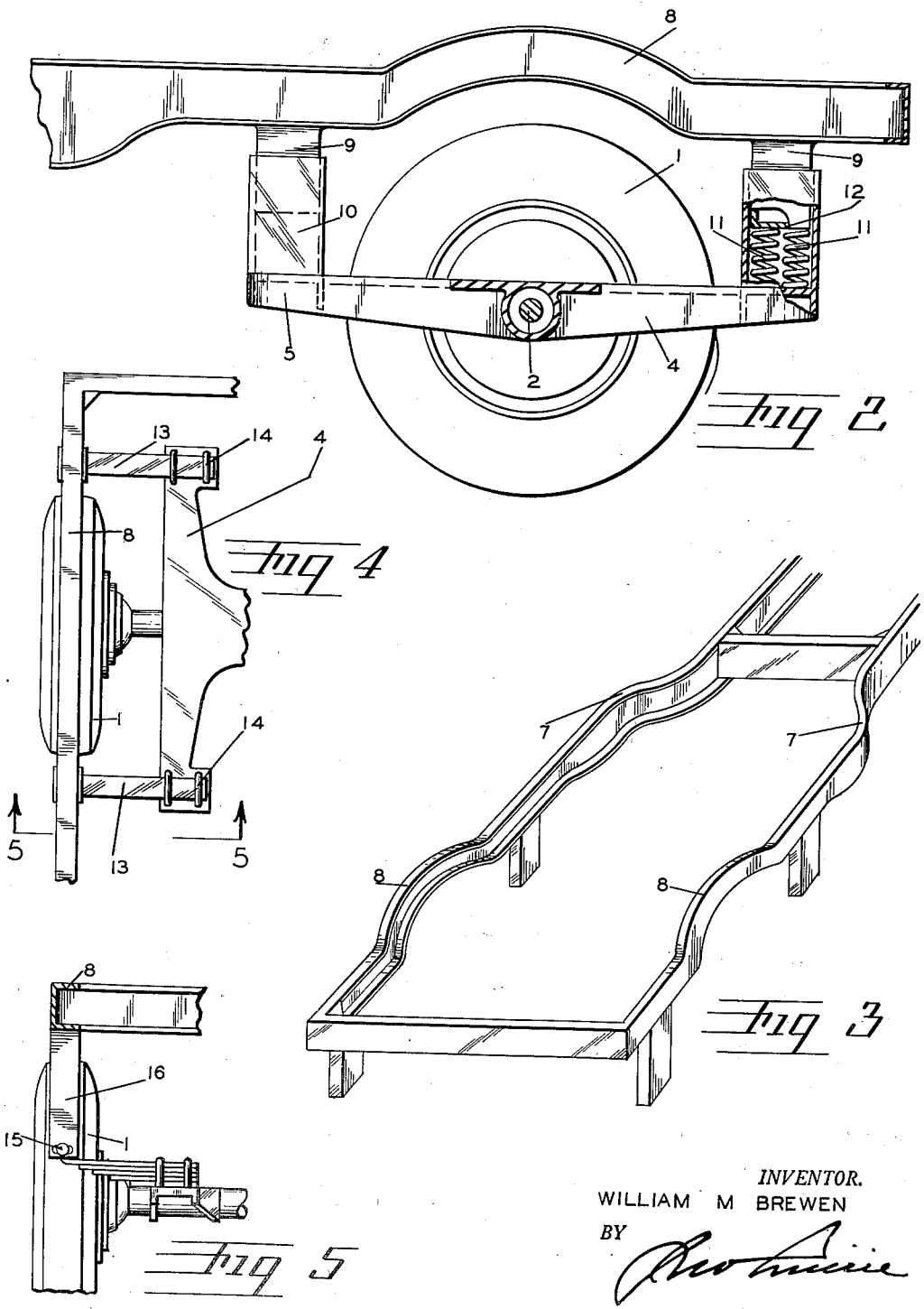

2,589,043

UNITED STATES PATENT OFFICE 2,589,043

FRAME FOR VEHICLES

William M. Brewen, San Jose, Calif.

Application August 6, 1947, Serial No. 766,491

3 Claims. (Cl. 280—106.5)

This invention relates to vehicle frames and is particularly adapted to be used in connection with heavy duty trucks or road tractors.

The primary object of the invention is to widen out the frame on the front end of a truck to the width of the tread of the wheels, or within the limits specified by law. By widening, the frame space is made available for mounting one or more power units, which is not possible with present day frame construction.

A further object of the invention is to provide room or space for additional auxiliary equipment pertaining to transmissions, generators, pumps and the like.

With the present day truck frame construction it is not possible to mount more than one motor in the frame, and the object of mounting more than one motor is to provide auxiliary power when needed on grades or heavy pulls.

With the present day equipment the speed of the vehicle is limited on grades, but with my specially designed frame permitting the additional auxiliary motor power the speed can be maintained on grades under heavy loads.

These and other incidental objects will be apparent in the drawings, specification and claims.

Referring to the drawings:

Figure 1 illustrates diagrammatically a plan of the front axle and wheel assembly of the truck or tractor, having my new and improved frame mounted thereon. I have eliminated parts for convenience of illustration. In this view I indicate by broken lines the suggested position of the motor units.

Figure 2 is a sectional view taken on line 2—2 of Figure 1 looking in the direction indicated and illustrating a preferred method of mounting the frame to the axle.

Figure 3 is a perspective view of the frame construction.

Figure 4 is another preferred form of spring mounting.

Figure 5 is a fragmentary sectional view taken on line 5—5 of Figure 4.

In the drawings:

I have illustrated a front wheel drive assembly consisting of the wheels 1, axle 2 and a differential box 3. This may be of any well known conventional construction and I do not wish to be limited to a front wheel drive assembly, as my invention is adapted to any type of wheel support.

The front wheel drive assembly, although not shown, may comprise the usual steering facilities as commonly employed in four wheel drive trucks.

My invention consists of mounting to the axle 2 a bolster bracket 4, having U-shaped extensions 5 straddling the wheels 1, best illustrated in Figure 1. The frame 6 of the truck is widened out at 7 so that the sides 8 of the frame are supported approximately over the wheels 1.

Extending downwardly from the side frames 8 are frame guides 9, which enter the guide wells or spring pockets 10, best illustrated in Figure 2. The wells 10 are fixedly mounted to the extension arms 5 of the framework of the bracket 4 and have springs 11 resting in said wells and adapted to support the bottom 12 of the frame guides 9. I do not wish to be limited to this type of spring suspension, as referring to Figure 4 the bracket 4 may have leaf springs 13 secured thereto in the usual manner at 14, and having their outer ends connected at 15 to the lower end of the pedestals 16, which form part of the frame 8. There are many and various methods of mounting the spring assembly; I have merely illustrated what I consider the preferred type.

Referring to Figure 1, I have illustrated by broken lines the approximate position of motors that may be installed within the widened portion of the frame. I have not illustrated in any way the method of mounting the same, but only wish to bring out the fact that the distance between the side frames 8 is at a maximum in accordance with road clearances and that this space is available for the mounting of the motors and accessories.

In the operation of trucks having my new frame design there is room as stated above for additional motors, which would probably be brought into effect only when the needed power became necessary.

I do not wish to be limited to the exact mechanical structure, as other mechanical equivalents may be substituted still coming within the scope of my claims.

What I claim as new is:

1. A vehicle chassis comprising a generally rectangular substantially coplanar frame to be supported horizontally, wheels supporting the frame, the front end portion of said frame being wider than the rear portion with the side members thereof lying in the planes of and above the wheels at said front end, spaced apart pedestals extending downwardly from said frame beyond the front and rear peripheries of said wheels, a bolster bracket mounted on the axle of said wheels and having arms extending laterally thereof beyond the front and rear peripheries of said front wheels and terminating under the side members of the frame in alignment with the pedestals, and springs interposed between the pedestals and the ends of the arms.

2. A vehicle chassis comprising a generally rectangular substantially coplanar frame to be supported horizontally, wheels supporting the frame, the front end portion of said frame being wider than the rear portion with the side members thereof lying in the planes of and above the wheels at said front end, spaced apart pedestals extending downwardly from said frame beyond the front and rear peripheries of said wheels, a bolster bracket mounted on the axle of said wheels and having arms extending laterally thereof beyond the front and rear peripheries of said front wheels and terminating in alignment with the pedestals, and springs interposed between the pedestals and the ends of the arms.

3. A chassis construction as defined in claim 2, wherein said springs comprise leaf springs extending laterally from said brackets and transversely of the frame to straddle said wheels with their outer ends supporting said frame bolsters.

WILLIAM M. BREWEN.

REFERENCES CITED

The following references are of record in the file of this patent:

UNITED STATES PATENTS

| Number | Name | Date |
| --- | --- | --- |
| 1,249,996 | Olsen | Dec. 11, 1917 |
| 1,602,966 | Ellzey | Oct. 12, 1926 |
| 2,194,356 | Eklund | Mar. 19, 1940 |
| 2,375,184 | Bernhard | May 8, 1945 |